A. L. McGREGOR.
AUTOMOBILE BUMPER.
APPLICATION FILED MAY 3, 1920.

1,361,599.

Patented Dec. 7, 1920.
2 SHEETS—SHEET 1.

Inventor
Allan L. McGregor
Offield Poole & Burton
Attys.

A. L. McGREGOR.
AUTOMOBILE BUMPER.
APPLICATION FILED MAY 3, 1920.
1,361,599.
Patented Dec. 7, 1920.
2 SHEETS—SHEET 2.
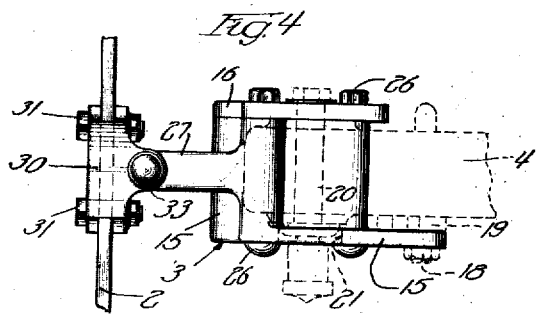
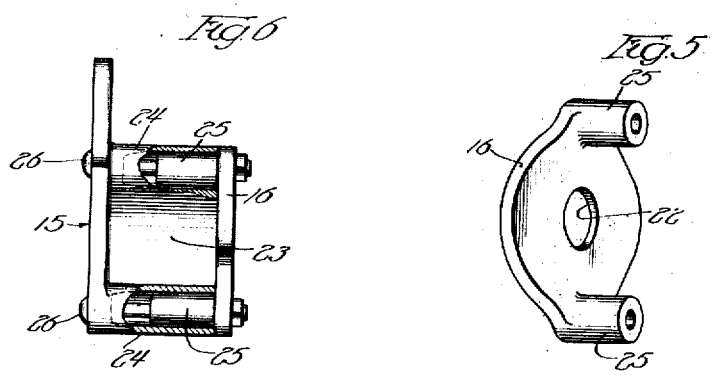
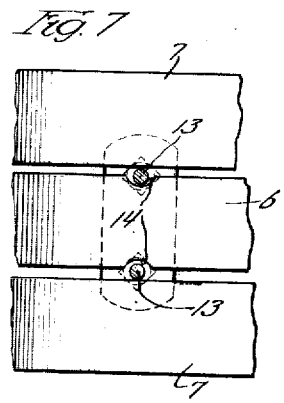

UNITED STATES PATENT OFFICE.

ALLAN L. McGREGOR, OF CHICAGO, ILLINOIS.

AUTOMOBILE-BUMPER.

1,361,599.   Specification of Letters Patent.   Patented Dec. 7, 1920.

Application filed May 3, 1920. Serial No. 378,385.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to devices of the character described which are constructed, for the most part, of metal bars having a degree of resiliency in the material itself to absorb the shock of impact, without the addition of springs or other shock absorbing means, the bars of which the bumper is constructed being bent or otherwise shaped to provide dependable protective means for the purpose for which these devices are ordinarily employed.

The object of this invention is to provide a construction for a bumper having the general characteristics hereinbefore suggested, and further embodying features pertaining to the formation of the inherently resilient material, calculated to effectively absorb shocks of impact without resulting in a permanent distortion of the bumper structure. A further feature of the invention pertains to a bracket for attaching the impact member of the bumper to the frame of the vehicle.

A bumper structure embodying the features of the invention is hereinafter fully described and illustrated in connection with the accompanying drawings, in which—

Figure 1:
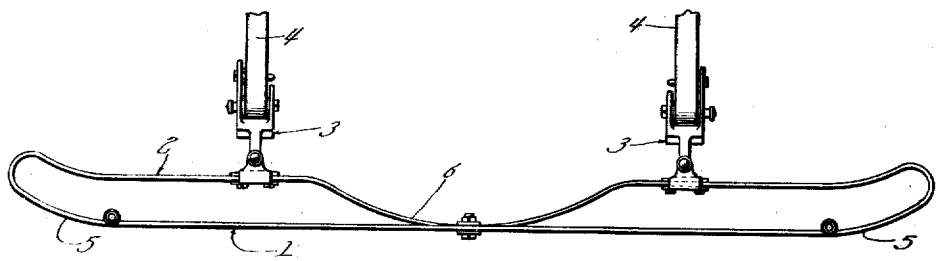
Figure 1 is a top plan view of the bumper attached to the vehicle frame.
Figure 2:
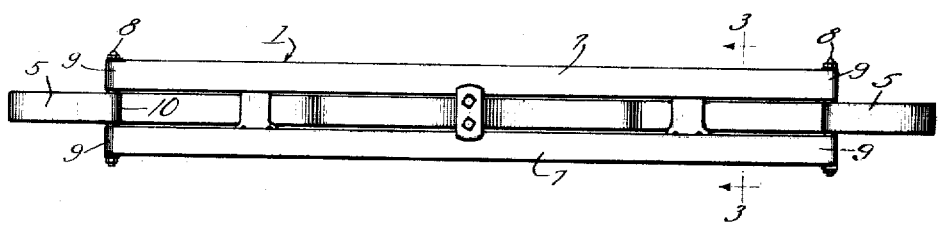
Fig. 2 is a view in front elevation of the bumper illustrated in Fig. 1.
Figure 3:
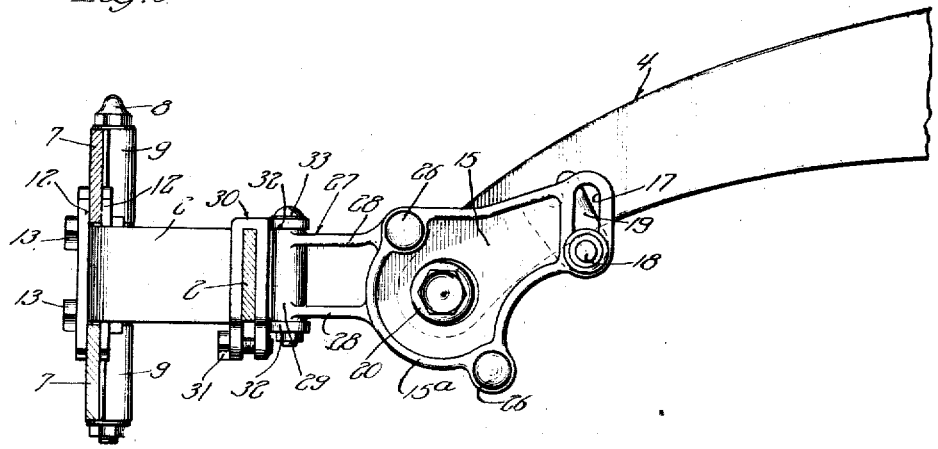

Fig. 3 is an enlarged detailed view in vertical section as taken on line 3—3 of Fig. 2, and showing the attaching bracket in said elevation, Fig. 4 is an enlarged top plan view of the attaching bracket, Fig. 5 is a perspective view of one of the side plates of the attaching bracket, Fig. 6 is a view in rear elevation of an attaching bracket removed from the vehicle frame member, and Fig. 7 is an enlarged fragmentary view showing the manner in which the several bars of the impact member are jointed together at the central portion of the bumper.

The bumper structure herein disclosed comprises in general the impact member or bumper proper consisting of a forwardly disposed impact section 1, a rearwardly disposed secondary bar 2, and attaching brackets 3—3 attached to the longitudinal frame members 4—4 of a vehicle, and having clamping engagement with the secondary bar 2.

Referring first to the construction of the impact member, the secondary bar 2 consists of a continuous member extending throughout the length of the bumper, and having its end portions bent forwardly and inwardly in U shape, forming end sections 5—5, terminating a short distance inwardly from the extremities of the impact member. The central portion 6 of the secondary bar 2 is bent or bowed forwardly, its mid-point lying in the vertical plane of the impact section 1 and engaged thereto in a manner hereinafter to be described.

The impact section or that portion of the bumper which ordinarily receives the initial shock of impact comprises two parallel bars 7—7, preferably of resilient material. these bars being spaced apart vertically and connected together at their ends and also to the extremities of the end sections 5—5 by means of vertically arranged bolts 8—8. As a preferable means of connecting the parts together as described, the ends of the bars 7—7, as well as the end sections 5—5, are bent to form eyes 9 and 10 respectively, the ends of the end sections 5—5 being introduced between the ends of the bars 7—7, and the bolts 8—8 passed through the eyes 9 and 10 positioned in registering relation. By this arrangement an impact section of increased area is formed which is pivotally connected at its ends to the single secondary bar 2, and extends throughout the central portion of the bumper, and further is uniformly distributed or arranged above and below said secondary bar 2. In addition to being pivotally connected to the ends of the secondary bar 2, the impact section 1 is further connected to said bar 2 at the central portion of the bumper, preferably by means of a pair of vertically arranged plates 12—12 which are clamped against opposite faces of the bars 7—7 of the impact section and the bowed portion 6 of the secondary bar 2, as clearly shown in Figs. 3 and 7, these plates being secured in position by means of bolts 13—13 connecting the plates together, and extending through the spaces separating the several bars. As shown in Fig. 7, the intermediate bar 6 has portions removed as at 14 to accommodate the bolts 13—13. In this manner the forward and rear portions of the bumper are connected together thereby providing a more suitable and rigid structure.

Referring now more in detail to the structure of the attaching brackets, there are two required, and both being identical in construction, a description of one will suffice. Referring therefore to one of these brackets, the same consists of two side plates 15 and 16 which are adapted to be clamped against opposite sides of a frame member 4, and at the extremity thereof. One of the side plates 15 is applied to the outer lateral face of the frame member 4 and consists of a suitably shaped member having a marginal bead 15ª and having a semi-circular conformation throughout its forward portion. The rear portion of the plate 15 is extended in the general direction of the frame member 4, and is provided with a vertical slot 17 adapted to receive a bolt 18 forming a part of a suitable clamping member 19 used for adjustably connecting the plate 15, a swell as the entire attaching bracket, to the lower edge of the frame member 4 at a point rearwardly of its extremity. The principal point of connection between the plate 15, as well as of the attaching bracket, is the pivot bolt 20 which is a part of the vehicle frame, said bolt extending through a central aperture 21 formed in the plate 15, and likewise through a similar opening 22 located in a corresponding position in the plate 16 on the opposite side of the frame member 4. Integral with the plate 15 and having the same conformation as the forward portion thereof, is a laterally extending flange 23 adapted to have abutting relation with the opposite or companion plate 16, there being further formed at the extremities of the flange 23 two integral sleeves 24—24, which form in effect laterally opening sockets which receive tubular extensions 25—25 integral with the plate 16, as clearly shown in Figs. 5 and 6. Arranged in diametrically opposed relation and extending laterally through the plates 15 and 16, as well as the sleeves 24—24 and tubular extensions 25—25 respectively, thereof, are bolts 26—26, these bolts serving to clamp the plates 15 and 16 securely together, the latter thus forming a box like structure surrounding the end of the frame member 4. Integral with the plate 15 is a forwardly projecting arm 27, having the nature of a vertical web reinforced by marginal beads 28—28, said arm terminating in a vertically disposed sleeve 29. Mounted at the end of the arm 27 is a clamping plate 30 comprising a U shaped yoke opening downwardly and adapted to receive within the space formed by the yoke, a bar 2, the latter being securely fixed in place by means of a bolt 31 extending through the lower extremities of the yoke forming portions of the clamping plate 30. Integral with the clamping plate 30 are two spaced lugs 32 adapted to engage the ends of the sleeve 29 of the arm 27, and a bolt 33 inserted through holes formed in said lugs and the said sleeve embraced by said lugs. The bolt preferably has a sufficient degree of looseness to permit rotative movement between the clamping plate and the arm 27, thus providing pivotal connection between the bumper and the attaching brackets 3—3. The attaching brackets herein described, together with the means for connecting the same with the bumper, provide a desirable supporting means for the impact member of the structure, in that it affords the necessary degree of relative movement between the parts so that they may freely yield at the instant of impact, thereby distributing the force uniformly throughout the entire structure, and after the shock has been absorbed, to return to their normal conformation. The attaching brackets are of exceedingly rugged construction, and thus are capable of withstanding the shock of impact without being fractured.

The features of construction described in connection with a preferred embodiment of the invention, may obviously be modified without departing from the spirit of the invention. Therefore, I do not wish to be limited except in so far as the invention is specifically set forth in the appended claims.

I claim as my invention:

1. An automobile bumper comprising a bar adapted for attachment to a vehicle frame and having its ends bent U shaped and a forwardly disposed impact section comprising parallel bars connected together at their ends, and with the free ends of said first mentioned bar.

2. An automobile bumper comprising a single bar extending throughout the length of the bumper structure, and bent U shape adjacent its ends to form forwardly disposed end sections, and an impact section comprising bars spaced apart vertically, the bars of said impact section embracing and having pivotal connection with said end sections.

3. An automobile bumper comprising a single bar extending throughout the length of the bumper structure, and bent U shape adjacent its ends to form forwardly disposed end portions, and an impact section comprising bars spaced apart vertically, the ends thereof having pivotal connection with said end portions of said first mentioned bar.

4. An automobile bumper comprising a bar extending throughout the length of the bumper structure, and bent in U shape at its ends, forming forwardly disposed end sections, an impact section comprising parallel bars spaced apart vertically and pivotally connected at their ends with said end sections, and intermediate their ends with said first mentioned bar.

5. An automobile bumper comprising a resilient bar extending lengthwise of the bumper structure, an impact bar spaced forwardly of said bar and pivotally connected at its ends with the ends of said first mentioned bar, the central portion of one of said bars being bowed into vertical alinement with the other of said bars, and clamping plates connecting said bars together intermediate the ends of said impact section.

6. An automobile bumper comprising a resilient bar extending lengthwise of the bumper structure, an impact section spaced forwardly of said bar and comprising parallel bars pivotally connected at their ends in vertically spaced relation to the ends of said first mentioned bar, the central portion of the latter being bowed outwardly and extending between the bars of said impact section, and clamping plates connecting said bars together intermediate the ends of said impact section.

7. An automobile bumper comprising a resilient bar extending throughout the length of the bumper structure, the ends of said bar being bent to form forwardly disposed end sections, and an impact section comprising parallel bars spaced apart vertically, and connected together at their ends and pivotally connected with the end sections, the central portion of said first mentioned bar being bowed outwardly into the vertical plane of said impact section and clamped thereto, and brackets adapted to be attached to the frame members of a vehicle and comprising clamping plates engaging said resilient bar.

8. An automobile bumper comprising a bar extending throughout the length of the bumper structure, the ends of said bar being bent to form forwardly disposed end sections, and an impact section comprising parallel bars spaced apart vertically, and connected together at their ends and with the end sections by bolts extending through eyes formed at the ends of the bars, the central portion of said first mentioned bar being bowed outwardly and extending between the bars of said impact section, and means connecting said bars together.

9. An automobile bumper comprising a rearwardly disposed resilient bar and a forwardly disposed impact section extending between and pivotally connected to the ends of said bar, and an attaching bracket, a plate fixed to a vehicle frame member having a forwardly extending arm and a clamping member engaging said resilient bar and pivotally mounted at the end of said arm.

10. An automobile bumper comprising an impact member formed of a rearwardly disposed resilient bar bent forwardly in U shape at its ends, and an impact section extending between and pivotally conected to the ends of said bar, and a bracket for attaching said impact member to the frame members of a vehicle comprising a plate fixed to the frame member, and provided with a forwardly extending arm and a clamping member engaging said bar and pivotally mounted at the end of said arm.

In witness whereof, I hereunto subscribe my name this 30th day of April, A. D. 1920.

ALLAN L. McGREGOR.